(12) United States Patent
Gervais

(10) Patent No.: US 8,429,139 B2
(45) Date of Patent: Apr. 23, 2013

(54) METHOD FOR PROCESSING A DIGITAL FILE NOTABLY OF THE IMAGE, VIDEO AND/OR AUDIO TYPE

(75) Inventor: Than Marc-Eric Gervais, Paris (FR)

(73) Assignee: I-CES (Innovative Compression Engineering Solutions), Paris (FR)

( * ) Notice: Subject to any disclaimer, the term of this patent is extended or adjusted under 35 U.S.C. 154(b) by 0 days.

(21) Appl. No.: 13/259,137

(22) PCT Filed: Apr. 3, 2009

(86) PCT No.: PCT/IB2009/005550
§ 371 (c)(1),
(2), (4) Date: Dec. 12, 2011

(87) PCT Pub. No.: WO2010/112957
PCT Pub. Date: Oct. 7, 2010

(65) Prior Publication Data
US 2012/0078861 A1 Mar. 29, 2012

(51) Int. Cl.
*G06F 7/00* (2006.01)
(52) U.S. Cl.
USPC .......................................................... 707/693

(58) Field of Classification Search .................... 707/693
See application file for complete search history.

(56) References Cited

U.S. PATENT DOCUMENTS

2008/0050047 A1* 2/2008 Bashyam et al. ............. 382/305

* cited by examiner

*Primary Examiner* — Pierre Vital
*Assistant Examiner* — Courtney Harmon
(74) *Attorney, Agent, or Firm* — Browdy and Neimark, PLLC

(57) ABSTRACT

A method for processing a digital file of the images, video and/or audio type which comprises a phase for putting into line per color layer and/or per audio channel, digital data of any audio, image and video file, a compression phase using algorithm in which each compressed value $VC_n$ of position N is obtained by subtracting from the value Vn of same position N of the original file, a predetermined number of successive compressed values ($VC_{n-1}, VC_{n-2}, \ldots$) calculated previously, and a restoration phase using an algorithm in which each restored value VDn of position N is obtained by adding to the value $VC_n$, of the same position of the compressed file, a predetermined number of successive compressed values ($VC_{n-1}, VC_{n-2}, \ldots$).

7 Claims, 2 Drawing Sheets

Restored values

METHOD FOR PROCESSING A DIGITAL FILE NOTABLY OF THE IMAGE, VIDEO AND/OR AUDIO TYPE

The present invention relates to a method for processing a digital file, notably of the image, video and/or audio type.

It notably but not exclusively applies to processing a file initially appearing in an original format and comprising at least two subsets of values.

More particularly, it proposes a processing operation including a compression phase with which a compressed file may be obtained, the values of which have reduced amplitude relatively to that of the values from the original file, and then a restoration phase with which from the compressed file, a file may be obtained having values, the amplitude of which is similar to that of the original file.

Generally, it is presently known that there are at least three compression methods by sub-sampling of image or video files, i.e.: color indexation, $YC_bC_r$ sub-sampling (also called YUV for video) and reduction of luminosity criteria.

The color indexation method consists of reducing to a single component, encoded on eight bits, the three RGB color components of an image. With this indexation method, it is possible to obtain a significant compression gain since the system only encodes a third of the original information. This indexation method is subdivided into two alternatives:

A static indexation method, also called indexation by induced palette consisting of assigning to each pixel one of the 256 combinations available to the system, and A dynamic indexation method, also called indexation by built palette, which imposes storage on eight bits of the three bytes which each combination of different colors represents.

$YC_bC_r$ (or YUV) sub-sampling for colorimetric reduction involves three distinct signals, i.e.:

A so-called Y luminance signal, made up from primary RGB signals weighted according to the eye sensitivity curve:

$Y=0.299R+0.587G+0.114B$

With two complementary so-called chrominance signals, the $C_b$ et $C_r$ information may be obtained:

$C_b=-0.169R-0.331G+0.500B+128$ $C_r=0.500R-0.419G-0.080B+128$

With this method, the luminance Y may be transmitted with a wide bandwidth which considerably cuts back the passband assigned to chromatic information borne by $C_b$ and $C_r$ (suppression of color information dealing with fine details which are not perceived by the users).

The method for reducing luminosity criteria consists of reducing the luminosity levels of the values, according to a determined scale, and of restoring the reduced values in their original luminosity criteria, with a constant error rate selected right from the compression phase. By its design, it is possible for it to correct certain errors generated by its compression method. This method notably has the following advantages:

a) It for example reduces the range of errors between the restored values and the original values to a deviation comprised between "−2" and "+2".
b) It for example reduces the height of the values transmitted to the encoder and therefore allows values to be encoded on 18 bits, those which should normally be encoded on 24 bits in $YC_bC_r$ sub-sampling.
c) It reduces the number of values to be encoded because of the reduction in the number of values and in their height. It further allows a reduction in the number of colors.
d) It allows all types of still and animated images to be processed, in particular images with a single component or with several components.
e) It is a self-contained compression method or module which may be integrated into an existing compression chain.
f) With it, files already compressed as Jpeg or Mpeg files may be "recompressed" in a performing way.
g) It uses a restricted number of operations for the compression like for the decompression.

Nevertheless it turns out that the aforementioned compression methods have a certain number of drawbacks.

Thus, notably, the limits of sub-sampling by static or dynamic indexation are well known:

Static indexation is a source of significant error. Further, this compression method is similar to the compression of a black and white image, for which it is difficult to strongly reduce the unique component on pain of not being able to restore it.

Dynamic indexation proves to be inefficient when dealing with an image defined by a high number of color combinations, such as a photograph for example: indexation of hundreds of thousands of colors also imposes storing the reference of hundreds of thousands of bytes multiplied by the number of color components of the image.

$YC_bC_r$ sub-sampling only imperfectly meets the problem of compression of images for four reasons:

a) Its design limits it to the processing of RGB images. Indeed, this method is not designed for processing files consisting of 1, 2 to 4 color components, like black and white images, bichrome images and CMJN files.
b) It is not a self-contained compression process. Indeed, it does not generate sufficient conversion of the file in order that it may be a self-contained compression process. Used alone, $YC_bC_r$ sub-sampling only generates low compression ratios. This is why known standards have added other algorithmic steps to it.
c) $YC_bC_r$ sub-sampling conceptually is an error propagation vector. Indeed, with this method, it is not possible to establish a one-to-one relationship between the original values and the restored values. The deviations between these values are generally located between "−1" and "+1". These deviations are even detectable to the naked eye when a compression system uses $YC_bC_r$ "4.2.2" sub-sampling. During decompression, this method uses an interpolation method consisting of adding between two successive values of the compressed file an additional value equal to the average of both compressed values, this additional value being supposed to replace the value which was suppressed during the compression process.

This solution causes deviations which are located between "−128" and "+128", i.e. which may reach "255".
d) $YC_bC_r$ sub-sampling leads to unbalanced colorimetric degradation. Indeed, by gathering on one side all the details of the image on a single component, the Y component, which is less strongly compressible on pain of rapidly reaching an irreversible degradation of the image, and by grouping on the other side the color information on the "$C_b$" and "$C_r$" components (understood as a synthesis of the original colors of the image) which are more strongly quantified, sub-sampling leads to restoring more visible defects because of differentiated processing of the information.

A contrario, statistically and conceptually, it is seen that reducing the subpixels of a color pixel by an identical ratio is more cost-effective: the risk of letting a luminosity difference appear between subpixels is actually considerably less than in the case of differentiated quantification of subpixels.

Now, this is the major criticism which may be addressed to compression by sub-sampling. Indeed, because of retinal persistence, it is the luminosity difference, notably between the subpixels which makes the defects more visible. It is therefore preferable that the luminosity of subpixels should vary according to the same ratio and in the same direction for all the subpixels (provided that it is not very far from the original luminosity).

e) The compression method by reducing luminosity criteria as for it has the following drawbacks:

It insufficiently reduces the deviations which distance the values of the file for which luminosity was reduced. On this matter, it is recalled that the reduction of the steps between these values is a determining element for obtaining performances in compression. Now, it is specifically this property which is lacking in the method for reducing criteria of luminosity, in spite of all those which it moreover cumulates.

It was not designed for compressing without any perceivable degradation, images with at most 256 colors.

Because of its definition, this method is not applicable to compression of audio flies.

As for audio files, the sub-sampling technique is based on a simple mathematical formula which consists of reducing the number of original samples per second, according to the method of "N" averaged values. For example for sub-sampling a 44,100 kHz file into a 22,050 kHz file, this method performs the two-by-two average of the values of samples. Only the average representing one sample out of two is retained. The volume of bytes of the original file is thereby reduced by half, although always encoding on 16 bits per channel.

The object of the invention more particularly is to meet new challenges posed by compression by novel methods for presenting images, videos and for producing sounds, which impose more quality and less compression.

For this purpose, it proposes a method for compressing a digital file comprising:

a phase for putting into line per layer of colors and/or per audio channel, digital data of any audio, image and video file and a compression phase in which the values of said file are successively compressed by means of an algorithm in which each compressed value of row N (i.e. $VC_N$) is obtained by subtracting from the value $V_N$ of the same row N of the original file, a predetermined number of successive compressed values ($VC_{N-1}$, $VC_{N-2}$, ... ) calculated previously, and a restoration phase in which each of the values of the compressed file is brought back to a value close to the corresponding value of the original file by means of an algorithm in which each restored value of row N (i.e. VDN) is obtained by adding to the value VCN of same row of the compressed file, a predetermined number of successive restored values ($VC_{N-1}$, $VC_{N-2}$, ... ).

Thus, the compression algorithm may be of the form:

$$VC_1 = \text{rounded to the closest unit}[(V_1-h) \times k]$$

$$VC_2 = \text{rounded to the closest unit}[(V_2-VC_1-h) \times k]$$

$$VC_3 = \text{rounded to the closest unit}[(V_3-VC_2-VC_1-h) \times k]$$

...

$$VC_N = \text{rounded to the closest unit}[(V_N-VC_{N-1}-VC_{N-2}-h) \times k] \quad \text{formula 1}$$

a relationship in which, $VC_N$ is the value of row N of the compressed file $VC_{N-1}$ is the previously calculated value of row N−1 of the compressed file $VC_{N-2}$ is the previously calculated value of row N−2 of the compressed file $V_N$ is the value of row N of the original file k and h are compression coefficients varying according to the sought compression level, for example:

Level 1 k=⅓ h=1

Level 2 k=⅕ h=3

Level 3 k=1/7 h=10

The restoration algorithm may be of the form:

$$VD_1 = \frac{1}{k}VC_1 + h \quad \text{formula 2}$$

$$VD_2 = \frac{1}{k}VC_2 + VC_1 + h$$

$$VD_3 = \frac{1}{k}VC_3 + VC_2 + VC_1 + h$$

...

$$VD_N = \frac{1}{k}VC_N + VC_{N-1} + VC_{N-2} + h$$

a relationship in which:

$VD_N$ is the restored value of row N $VC_{N-1}$ is the compressed value of row N−1

$VC_{N-2}$ is the compressed value of row N−2

With this solution, it is therefore possible to obtain a contraction of the amplitude of the values of the file and to reconstruct a restored file by using a determined number of successive values of the compressed file.

Particularly advantageously, the method described earlier applies in the case of files such as for example image, video and/or audio files including at least two sets of consecutive values. In this case, the compression processing operation may comprise:

a preliminary phase for selecting from both sets, the one for which the average deviation separating the digital values of this set is larger than the average deviation which separates the values of the other set, a phase for compressing the selected set by using a compression algorithm of the type previously described, for example of the type:

$$VC_N = \text{rounded to the closest unit}[(V_N-VC_{N-1}-VC_{N-2}-h) \times k] \quad \text{formula 1}$$

a phase for compressing the second set by means of a compression algorithm involving for the calculation of each of the values:

$$VC'_1 = \text{rounded to the closest unit}[(V'_1-h) \times k]$$

$$VC'_2 = \text{rounded to the closest unit}[(V'_2-VC_1-h) \times k]$$

$$VC'_3 = \text{rounded to the closest unit}[(V'_3-VC_2-VC_1-h) \times k]$$

...

$$VC'_N = \text{rounded to the closest unit}[(V'_N-VC_{N-1}-VC_{N-2}-h) \times k] \quad \text{formula 3}$$

a formula in which:
$V'_N$ is the value of row N of the second file
$VC_{N-1}$ is the compressed value of row N−1 of the first file
$VC_{N-2}$ is the compressed value of row N−2 of the first file.

In this case, restoration of the values of the first file may be carried out according to the restoration algorithm:

$$VD_N = \frac{1}{k}VC_N + VC_{N-1} + VC_{N-2} + h \quad \text{formula 2}$$

$VD_N$ being the restored value of row N of the first file.

Restoration of the values of the second file may then be carried out according to the algorithm:

$$VD'_1 = \frac{1}{k}VC'_1 + h \quad \text{formula 4}$$

$$VD'_2 = \frac{1}{k}VC'_2 + VC_1 + h$$

$$VD'_3 = \frac{1}{k}VC'_3 + VC_2 + VC_1 + h$$

$$VD'_N = \frac{1}{k}VC'_N + VC_{N-1} + VC_{N-2} + h$$

$VD'_N$ being the restored value of row N of the second file.

A significant advantage of the method described earlier lies in the fact that it is possible to find a remedy to the problems posed by the utilization of multisupport multimedia digital data and in the fact that it is adapted to the characteristics of digital files:

mono 8 and 16 bit audio
16 bit and more multichannel audio
Images with 1, 2, 3 and 4 color components
Videos with 1, 2, 3 color components
Fixed or animated 2D and 3D images Moreover, it is possible to largely solve the problems posed by the optimization of the existing compression processes in that:

it is a self-contained compression process raising the compression ratios of sequential coding systems of the LZW type or statistical coding systems of the "Huffman" type, it may be inserted in the existing compression chains, as a compression module which may be used as:
an additional step
and alternative to certain existing steps such as the $YC_bC_r$ transform
and an alternative to certain phases of certain existing steps such as the $C_bC_r$ transform
an optimization method integrated into a transformation formula of the $YC_bC_r$ transform or quantification table type.

In the case when it is desired to obtain a larger compression gain (with a slight difference between the restored values and the original values of the audio, image or video file), the processing operation according to the invention may comprise:

a compression phase using an algorithm of the form:

$$VC_1 = \text{rounded to the closest unit} \left[ i - \frac{(V_1 - i)}{0,1i} \right] \quad \text{formula 5}$$

$$VC_2 = \text{rounded to the closest unit} \left[ i - \frac{(V_2 - VC_1 - i)}{0,1i} \right]$$

$$VC_3 = \text{rounded to the closest unit} \left[ i - \frac{(V_3 - VC_2 - VC_1 - i)}{0,1i} \right]$$

...

$$VC_N = \text{rounded to the closest unit} \left[ i - \frac{(V_N - VC_{N-1} - VC_{N-2} - i)}{0,1i} \right]$$

i=a coefficient depending on the sought compression levels with i>1 and a restoration phase using an algorithm of the form:

$$VD_1 = -0,1iVC_1 + 0,1i^2 + i = i(-0,1VC_1 + 0,1i+1)$$

$$VD_2 = i(-0,1VC_2 + 0,1i+1) + VC_1$$

$$VD_3 = i(-0,1VC_3 + 0,1i+1) + VC_2 + VC_1$$

...

$$VD_N = i(-0,1VC_N + 0,1i+1) + VC_{N-1} + VC_{N-2} \quad \text{formula 6}$$

It is therefore found that the method according to the invention provides:

a remedy to the axiomatic rules of compression by reducing the amplitude of the values, the deviations between the values and the number of values by thereby limiting the different increments, the establishment of a constant range of contracted values, depending on the selected compression level and, accordingly, the strict restriction of the range of errors between the restored values and the values which have to be restored, i.e.:

either the original values when the method is used as a self-contained compression process, or the values which one of the compression steps of the existing systems would have established without any intervention of the method according to the invention.

By means of these particularities, with the method according to the invention, it is notably possible:

to reduce as far as possible the total number of values transmitted to the sequential or statistical encoder so that the volume of compressed file bytes is as small as possible, while restoring a file similar to the original or similar to what it should have been without the intervention of the method according to the invention, according to a loss level strictly defined beforehand and classified according to the nature of the digital file
timeless (image)
time-dependent (audio and video)
the destination of the file covering the range
from digital cinema to monitoring video
from published images to the thumbnail images of a mobile telephone An embodiment of the method according to the invention will be described hereafter, as a non-limiting example, with reference to the appended drawings wherein:

FIG. 1 shows a file comprising three 8×8 blocks of values of an image for red, green and blue colors (RB, GB, BB), respectively;

FIG. 2 shows the organization of the values of the blocks of FIG. 1 on three respective lines (red, green, blue) (RL, GL, BL);

First of all, it is recalled that the processing of a digital image customarily involves the breaking down of the three components of the image, for example RGB or YUB into blocks of 8×8 pixels.

Figures 1, 2:
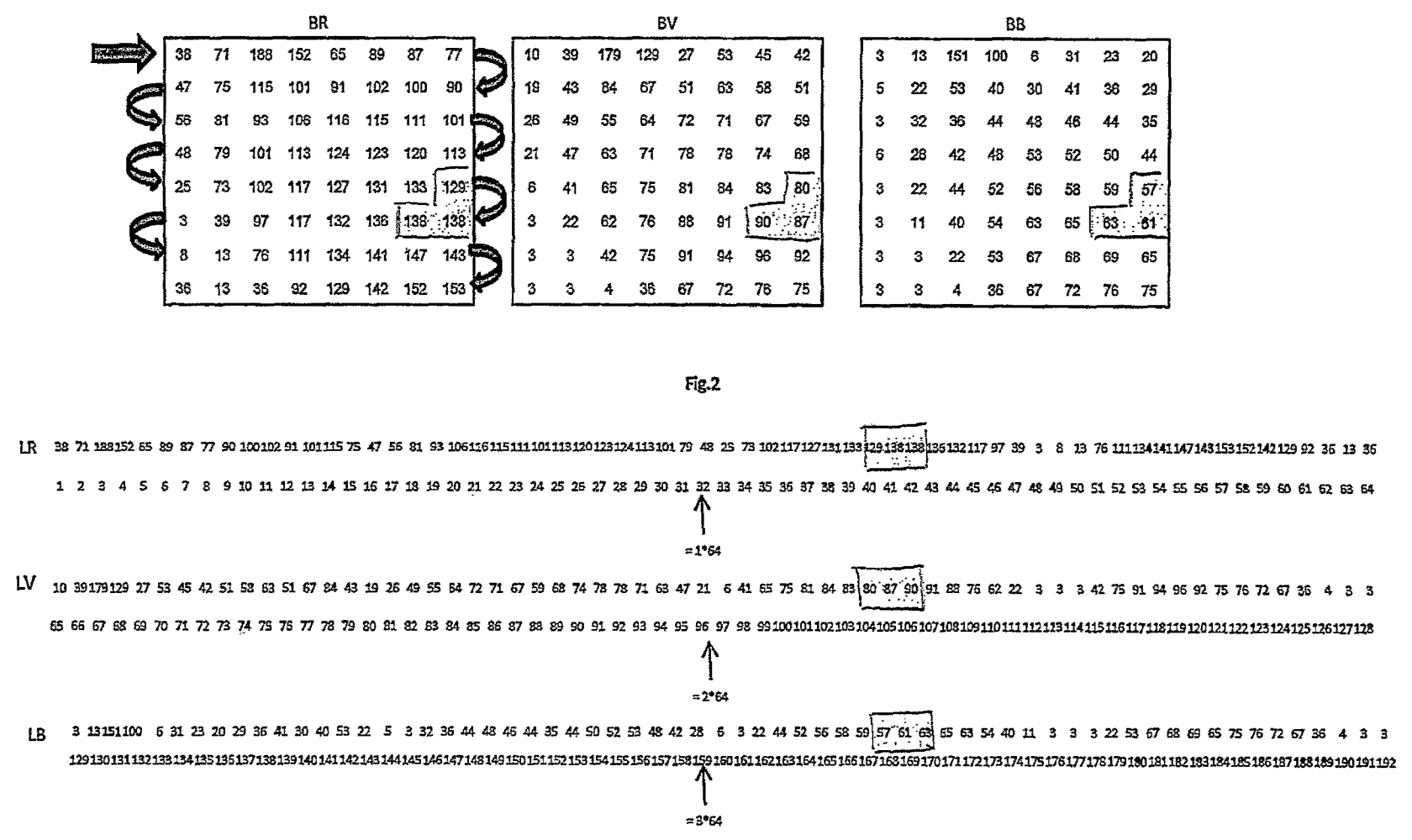

FIG. 1 shows an example of homologous blocks, red RB, green GB, blue BB, in each of which appear the 64 values assigned to the pixels.

In order to facilitate understanding, three consecutive homologous values are marked by a frame, i.e. the values 129, 138, 138 for the red block RB, the values 80, 87, 90 for the green block GB and the values 57, 61, 63 for the blue block BB.

Processing of these blocks RB, GB, BB, within the scope of the method according to the invention, first of all comprises a preliminary phase consisting of sequentially organizing the values of these blocks RB, GB, BB, on three respective lines, in each of which the values occupy the positions 1-64 and follow each other according to an order which is determined by the reading mode of the used block. In this example, the reading mode is of the alternating type, the successive reading of two adjacent lines being carried out in the opposite direction to each other as indicated in FIG. 1.

In FIG. 2 which shows the three lines RL, GL, BL, obtained from blocks RB, GB, BB, the three marked values occupy the rows 40, 41, 42 respectively.

The diagrams illustrated in FIGS. 3-7 have been laid out so as to allow the comparison of the amplitudes of the values (in ordinates) to be performed depending on their row (in abscissae), the rows of the values corresponding to the RL line ranging from 1-64, the rows of the values corresponding to the GL line ranging from 65-128 and the rows of the values corresponding to the BL line ranging from 129-192 (FIG. 2).

Figure 3:
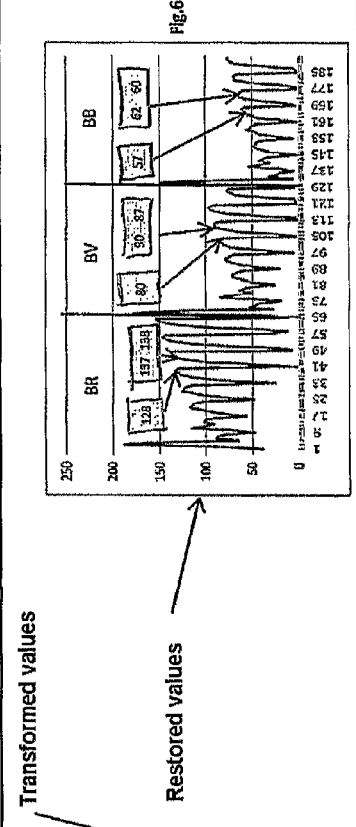
FIGS. 3-7 are diagrams representing the amplitudes of the values of an original image (FIG. 3), after $YC_bC_r$ compression (FIG. 4), after compression in accordance with the method according to the invention (FIG. 5), after $YC_bC_r$ restoration (FIG. 6) and after restoration (FIG. 7) in accordance with the method according to the invention.

The graph of FIG. 3 which shows the amplitude of the values of the original RGB image shows a variation of values between 3 and 188 with peaks for values of row 3, 67 and 131.

Figure 4:
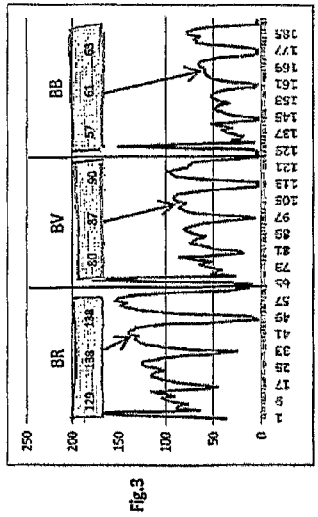

In the graph of FIG. 4 which shows the amplitude obtained after $YC_bC_r$ type conversion of the values of the original image, variations like those of the red values of the graph of FIG. 3 are again found but substantially attenuated for the values of Y (which occupy the rows 1-64). On the other hand, the values $C_b$, $C_r$ which occupy the rows 65-128 and 129-192 form two successive plateaus respectively located around 110 for $C_b$ and around 150 for $C_r$. It is seen that the values of these three components spread out between the values 3 and 178.

Figure 5:
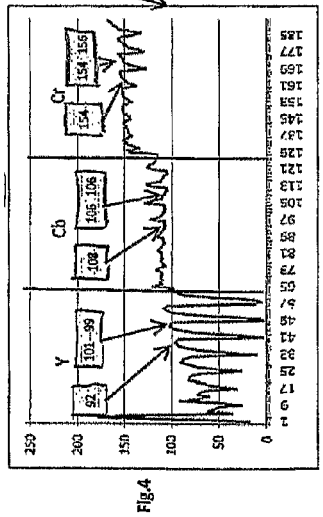

The graph illustrated in FIG. 5 shows that the compressed values, obtained by the method according to the invention, remain at a not very high level (between −8 and 59) relatively to the corresponding values of the original image (RGB blocks) (FIG. 3) and to those obtained by $YC_bC_r$ conversion (FIG. 4).

This property is particularly visible at the peaks of values present in the diagrams of FIGS. 3 and 4, RGB and $YC_bC_r$.

Thus, notably, the peaks formed with values from row 3 in FIGS. 3 and 4 respectively rise to 188 and 178, while for the same row, the corresponding value obtained by the method according to the invention is of the order of 53 (by using the compression formula 1 with k=⅓ and h=1 (FIG. 5)).

Figure 6:
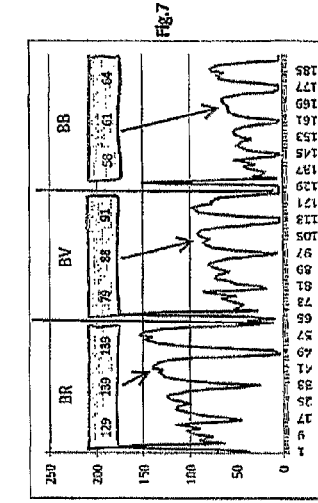
Figure 7:
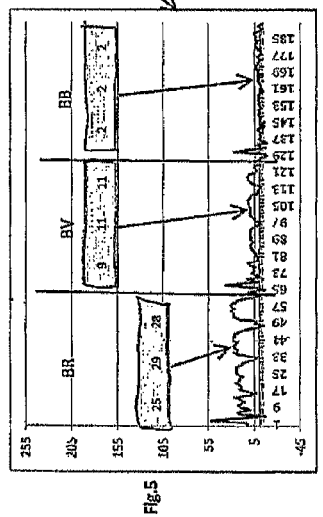

On the other hand, at the end of the processing (after reconstruction) restored values are again found (FIG. 7) very close to those of the values of the original image (FIG. 3) and to those obtained after restoration of the values of the $YC_bC_r$ conversion (FIG. 6).

It therefore appears that without causing observable degradation of the restored image relatively to the initial image, with the method according to the invention, it is possible to considerably reduce the volume of bytes of the compressed file. Further, with the simplicity of the algorithmic compression and restoration process, relatively high processing rates may be obtained.

The invention claimed is:

1. A method for processing a digital file notably of the image, video and/or audio type, comprising
   a phase for putting into line per color layer and/or per audio channel, digital data of any audio, image and video file,
   a compression phase in which the values of said file are successively compressed by means of an algorithm in which each compressed value ($VC_N$) of row N is obtained by subtracting from the value $V_N$ of same row N of the original file, a predetermined number of successive compressed values ($VC_{N-1}$, $VC_{N-2}$, ... ) calculated previously, and
   a restoration phase in which each of the values of the compressed file is brought back to a value close to the corresponding value of the original file by means of an algorithm in which each restored value ($VD_N$) of row N is obtained by adding to the value $VC_N$, of same row of the compressed file, a predetermined number of successive restored values ($VC_{N-1}$, $VC_{N-2}$, ... ).

2. The method according to claim 1, wherein the compression algorithm is of the form:

$$VC_1 = \text{rounded to the closest unit}[(V_1-h) \times k]$$

$$VC_2 = \text{rounded to the closest unit}[(V_2-VC_1-h) \times k]$$

$$VC_3 = \text{rounded to the closest unit}[(V_3-VC_2-VC_1-h) \times k]$$

...

$$VC_N = \text{rounded to the closest unit}[(V_N-VC_{N-1}-VC_{N-2}-h) \times k] \quad \text{formula 1}$$

a relationship in which,
$VC_N$ is the value of row N of compressed file
$VC_{N-1}$ is the previously calculated value of row N−1 of the compressed file
$VC_{N-2}$ is the previously calculated value of row N−2 of the compressed file
$V_N$ is the value of row N of the original file
k and h are compression coefficients varying according to the sought compression level.

3. The method according to claim 2, wherein:
for a level 1 k=−⅓, h=1
for a level 2 k=−⅕, h=3
for a level 3 k=−⅐, h=10.

4. The method according to claim 1, wherein the restoration algorithm is of the form:

$$VD_1 = \frac{1}{k}VC_1 + h \qquad \text{formula 2}$$

$$VD_2 = \frac{1}{k}VC_2 + VC_1 + h$$

$$VD_3 = \frac{1}{k}VC_3 + VC_2 + VC_1 + h$$

...

$$VD_N = \frac{1}{k}VC_N + VC_{-1} + VC_{N-2} + h$$

a relationship in which:
$VD_N$ is the restored value of row N
$VC_{N-1}$ is the compressed value of row N−1
$VC_{N-2}$ is the compressed value of row N−2.

5. The method according to claim 1 for processing a file including at least two sets of values, further comprising:
 a preliminary phase for selecting from both sets, the one for which the average deviation separating the digital values of this set is larger than the average deviation which separates the values of the other set,
 a phase for compressing the selected set by using a compression algorithm of the type of that described earlier for example of type:

$$VC_N = \text{rounded to the closest unit}[(V_N - VC_{N-1} - VC_{N-2} - h) \times k] \qquad \text{formula 1}$$

a phase for compressing the second set, by means of a compression algorithm which involves for calculating each of the values $$VC'_1 = \text{rounded to the closest unit}[V'_1 - h) \times k]$$

$$VC'_2 = \text{rounded to the closest unit}[V'_2 - VC_1 - h) \times k]$$

$$VC'_3 = \text{rounded to the closest unit}[V'_3 - VC_2 - VC_1 - h) \times k]$$

...

$$VC'_N = \text{rounded to the closest unit }[V'_N - VC_{N-1} - VC_{N-2} - h) \times k] \qquad \text{formula 3}$$

a formula in which:
$V'_N$ is the value of row N of the second file
$VC_{N-1}$ is the compressed value of row N−1 of the first file
$VC_{N-2}$ is the compressed value of row N−2 of the first file.

6. The method according to claim 5, wherein the restoration of the values of the aforesaid first set is carried out according to the restoration algorithm:

$$VD_N = \frac{1}{k}VC_N + VC_{N-1} + VC_{N-2} + h \qquad \text{formula 2}$$

$VD_N$ being the restored value of row N of the first file, and in that the restoration of values of the second file is carried out according to the algorithm:

$$VD'_1 = \frac{1}{k}VC'_1 + h \qquad \text{formula 4}$$

$$VD'_2 = \frac{1}{k}VC'_2 + VC_1 + h$$

$$VD'_3 = \frac{1}{k}VC'_3 + VC_2 + VC_1 + h$$

$$VD'_N = \frac{1}{k}VC'_N + VC_{N-1} + VC_{N-2} + h$$

$VD'_N$ being the restored value of row N of the second file.

7. The method according to claim 1, further comprising:
a compression phase using an algorithm of the form:

$$VC_1 = \text{rounded to the closest unit}\left[i - \frac{(V_1 - i)}{0,1i}\right] \qquad \text{formula 5}$$

$$VC_2 = \text{rounded to the closest unit}\left[i - \frac{(V_2 - VC_1 - i)}{0,1i}\right]$$

$$VC_3 = \text{rounded to the closest unit}\left[i - \frac{(V_3 - VC_2 - VC_1 - i)}{0,1i}\right]$$

...

$$VC_N = \text{rounded to the closest unit}\left[i - \frac{(VN - VCN - 1 - \cdot VCN - 2 - i)}{0,1i}\right]$$

i=a coefficient depending on the sought compression level with i>1
and
a restoration phase using an algorithm of the form:

$$VD_1 = -0,1iVC_j + 0,1i^2 + i = (-0,1VC_1 + 0,1i + 1)$$

$$VD_2 = i(-0,1VC_2 + 0,1i + 1) + VC_1$$

$$VD_3 = i(-0,1VC_3 + 0,1i + 1) + VC_2 + VC_1$$

...

$$VD_N = i(-0,1VC_N + 0,1i + 1) + VC_{N-1} + VC_{N-2} \qquad \text{formula 6.}$$

* * * * *

UNITED STATES PATENT AND TRADEMARK OFFICE
CERTIFICATE OF CORRECTION

PATENT NO.        : 8,429,139 B2
APPLICATION NO. : 13/259137
DATED             : April 23, 2013
INVENTOR(S)       : Than Marc-Eric Gervais Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 23 days.

Signed and Sealed this
Eighth Day of September, 2015

Michelle K. Lee
*Director of the United States Patent and Trademark Office*